April 21, 1953  J. M. RICHARDS  2,635,502
INSTRUMENT FOR TESTING EYES
Filed June 17, 1948  4 Sheets-Sheet 1

INVENTOR.
John M. Richards
BY Emery, Varney,
Whittemore & Dix
ATTORNEYS.

April 21, 1953  J. M. RICHARDS  2,635,502
INSTRUMENT FOR TESTING EYES
Filed June 17, 1948  4 Sheets-Sheet 3

INVENTOR.
John M. Richards
BY Emery Varney,
Whittemore & Dix
ATTORNEYS.

INVENTOR.
John M. Richards
BY Emery, Varney,
Whittemore & Dix
ATTORNEYS.

Patented Apr. 21, 1953

2,635,502

UNITED STATES PATENT OFFICE 2,635,502

INSTRUMENT FOR TESTING EYES

John Mark Richards, Santa Barbara, Calif.

Application June 17, 1948, Serial No. 33,563

15 Claims. (Cl. 88—20)

This invention relates to apparatus for testing the eyes, and more especially for testing tonic muscle imbalance, though the apparatus is not limited to such use.

It is an object of the invention to provide an improved machine for exihibting targets to a patient whose eyes are to be tested. The instrument provides apparatus for making a variety of tests which it has not been possible to make previously with a single instrument. Another object of the invention is to provide test apparatus in which targets can be moved to compensate for tonic muscle imbalance and in which the extent of imbalance can be read directly from the apparatus in prism diopters.

Some features of the invention relate to the controls for changing the positions of various parts of the instrument, and for changing the location of the instrument as a whole with respect to the chin support and head rest that hold the patient's face in a fixed position during the test period. One feature relates to the movement of the apparatus for testing for near vision with the eyes down, the position commonly used for reading.

Other objects, features and advantages of the invention will appear or be pointed out as the description proceeds.

In the drawing, forming a part hereof, in which like reference characters indicate corresponding parts in all the views.

Figures 3, 8:
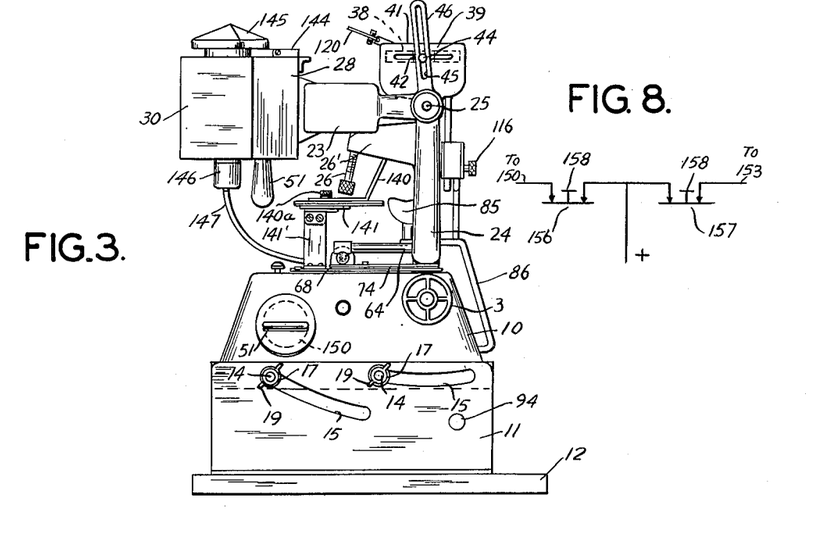
Fig. 8 is a wiring diagram for a part of the control means.

The instrument comprises a housing 10 supported by angular brackets 11 from a base 12. There is an angular bracket 11 at each end of the housing 10, and each end of the housing has stud bolts 14 extending through arcuate slots 15 (Fig. 3) in the upstanding legs of the angular brackets 11.

There are washers 17 on the stud bolts on opposite sides of the bracket 11 (Fig. 2) and the housing 10 can be clamped in any position with respect to the brackets 11 by tightening wing nuts 19 one of which is threaded on to each of the stud bolts 14.

When the stud bolts 14 are at the rearward ends of the slots 15 (the left hand ends of the slots in Fig. 3), the housing 10 is in a level position. When the wing nuts 19 are loosened, and the stud bolts 14 are moved along the slots 15 toward the forward ends of the slots, that is, toward the right in Figure 3, the housing 10 is rocked about an axis which passes through the centers of rotation of the eyes of a patient whose head is supported by a head rest that will be described. In the preferred embodiment of the invention, the base 10 is tilted downwardly through an angle of approximately 20° from the horizontal when the stud bolts 14 are moved to the forward ends of the slots 15. This 20° angle corresponds to the approximate angle by which the eyes are depressed when reading.

Figure 1:
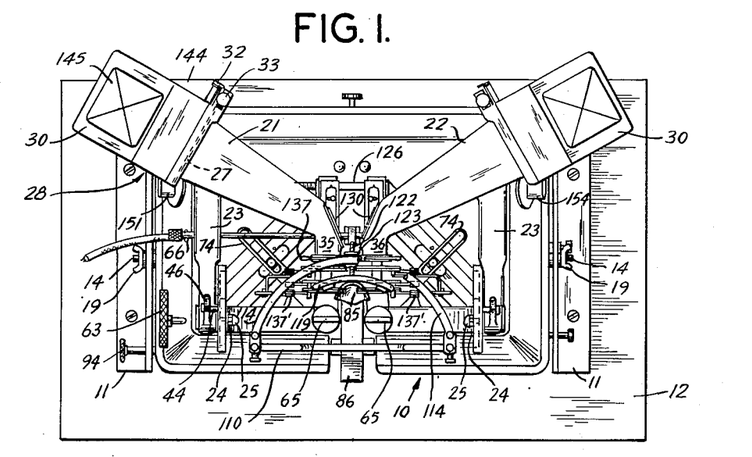
Fig. 1 is a top plan view of an eye testing instrument embodying this invention.

The instrument has two barrels 21 and 22 (Fig. 1), each of which has a forwardly extending bracket 23 connected with a post 24 by pivot connections 25. The axis of the left hand pivot connection 25 is in line with the center of rotation of the patient's left eye, and the axis of the right hand pivot connection 25 is in line with the center of rotation of the patient's right eye. This means that as the barrels 21 and 22 are shifted angularly for vertical adjustment about the axes of the pivot connections 25, the barrels are moving about the centers of rotation of the respective eyes for which are they used.

In order to hold the barrels 21 and 22 in any selected angular position about the axis of the pivot connections 25, there is a screw 26 which threads through a lug 26' at the back of the post 25. This screw contacts with the underside of the bracket 23.

At the rearward end of the barrel 21 there is a frame 27 to which a target holder 28 is connected by a circular bearing which permits the target holder 28 to be rotated about the longitudinal axis of the barrel 21. A lamp housing 30 is connected to the rearward end of the target holder 28 and is preferably integral therewith. A similar frame, target holders and lamp housing are connected with the rearward end of the other barrel 22.

Figure 7:
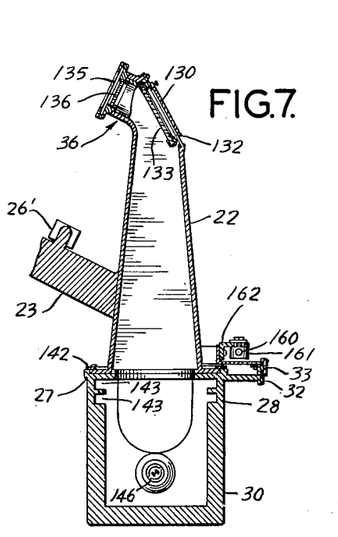
Figure 7 is a horizontal sectional view through one of the barrels and target holders shown in Figures 1 to 3.

The construction of the frame 27 and its connection with the target holders 28 will be described more fully in connection with Figure 7, and it is sufficient for the present to understand that the target holders 28 and lamp housing 30 can be rotated as a unit about the axis of the barrel 21, and that an angular scale 32 (Fig. 4) attached to the target holder moves past an indicator 33 on the barrel 22 to indicate the angle through which the target holder 28 is turned. The indicator 33 preferably has a vernier scale associated with it.

The forward end of the barrel 21 (Fig. 1) is formed with an eye piece 35 extending at an obtuse angle to the axis of the barrel. A similar eye piece 36 is formed on the forward end of the right hand barrel 22; and when the barrels 21 and 22 are properly adjusted, by apparatus which will be described, for the correct interpupilary distance of the patient, the patient's left and right eyes look into the eye pieces 35 and 36 respectively. Reflectors in the barrels 21 and 22 deflect the lines of vision into alinement with the longitudinal axes of the barrels 21 and 22.

For measuring any angles through which the barrels 21 and 22 are swung about their pivot connections 25, there is a scale 38 (Fig. 3) on a bracket 39 which is rigidly connected to the upper end of the post 24. A slot 41 in the bracket 39 provides a guide for a block 42 which is slidable along the slot. An indicator and vernier on the block 42 cooperate with the scale 38 on the bracket 39.

A pin 44 extends out from the block 42 and into a slot 45 in an arm 46 which is rigidly connected at its lower end with the bracket 23 of the barrel 21. As the arm 46 moves angularly about the axis of the pivot connection 25, the sides of the slot 45 move the pin 44 and block 42 one way or the other, depending upon the direction of angular movement of the arm 46, along the guide slot 41.

The scale 38 has uniform graduations reading directly in prism diopters which correspond with the angular adjustment of the barrel 21 about the axis of the pivot connections 25. Since prism diopters are a tangent function, and the scale 38, therefore, being tangential, has uniform graduations, it is possible to use a vernier scale on the block 42; and this is an important advantage of the instrument because small changes in the angular positions of the barrels are of considerable significance in deriving the clinical data for computing prescriptions. Each of the barrels 21 and 22 is provided with a downwardly extending handle 51 for moving the barrels angularly about the axes of their pivot connections.

Figure 4:
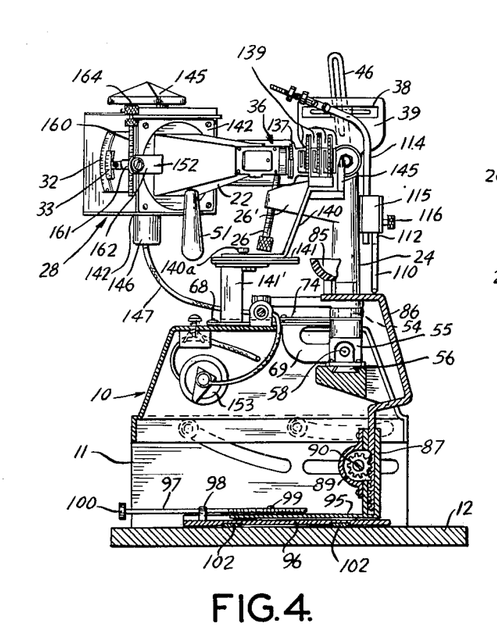
Fig. 4 is a sectional view taken on the line 4—4 of Fig. 2.
Figure 6:
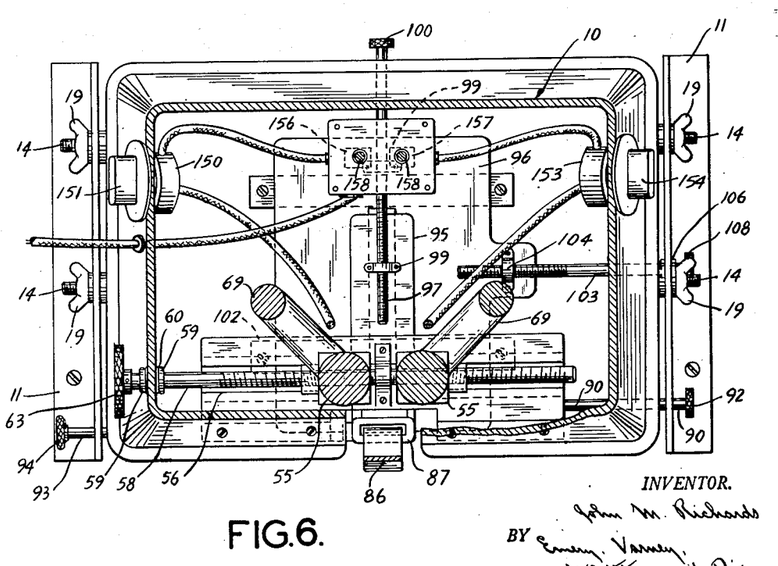

Each of the posts 24 extends downwardly and then inwardly to a vertically extending pivot 54 (Fig. 2) that connects the lower end of the post with a supporting block 55, best shown in Figure 4. The supporting block 55 slides along a dovetailed guide 56 attached to the inside wall of the housing 10. These blocks 55 can be adjusted toward and from one another to shift the posts 24, and the structure supported by the posts, to accommodate the instrument to the inerpupilary distance of the patient and aline the axes of the eye pieces 35 and 36 with the centers of rotation of the left and right eyes, respectively. This adjustment is made by a screw 58 which is held against transverse movement by thrust collars 59 (Fig. 6) located on opposite sides of a thrust bearing 60 secured to the housing 10.

The screw 58 has a threaded portion with right hand threads extending through a lug of the block 55 for the right hand post 24, and a threaded portion with left hand threads extending through a lug of the block 55 for the left hand post 24. Rotation of the screw 58 in one direction, therefore, moves the blocks 55 closer together and rotation of the screw in the opposite direction moves the blocks 55 apart. The screw 58 is made long enough to extend through one end of the housing 10 and is provided with a wheel or knob 63 by which the screw can be manually rotated.

The axis of the pivot 54 (Fig. 2) for the right hand post 24 is in line with the center of rotation of the right eye of the patient, and the axis of the pivot 54 for the left hand post 24 is in line with the center of rotation of the left eye of the patient when the patient's head is fixed in the proper position on the instrument.

There is an arm 64 (Fig. 5) on each of the pivots 54 immediately above the lower end of each post 24. Each arm 64 and each post 24 can swing on its pivot 54 independently of one another, but there is a clutch operated by a handle 65 for connecting each arm 64 and the adjacent post 24 so that they swing together as a unit on the pivot 54.

Angular movement of the arms 64 about the pivots 54 is controlled by a lead screw 66 that passes through nuts at the outer ends of the arms 64. These nuts are connected with the arms 64 in such a way that angular movement of the arms 64 does not move the nuts out of alinement.

The lead screw 66 is held against longitudinal displacement by a thrust bearing 67 attached to the frame 10. The screw 66 can move transversely in the thrust bearing 67 as the arms 64 swing, but the thrust bearing 67 prevents displacement of the screw 66 in the direction of the axis of the screw. There are right and left hand threads on the lead screw 66 extending through the nuts on the ends of the respective arms 64. Rotation of the lead screw, therefore, moves the arms 64 angularly in opposite directions about the pivots 54. When the handles 65 have been turned into positions to clutch the posts 24 to the arms 64, adjustment of the lead screw 66 swings the barrels 21 and 22 to change their convergence distance.

The pivot connections 25 (Fig. 2) with horizontal axes in line with the centers of rotation of the eyes, and the pivots 54 with vertical axes in line with the centers of rotation of the respective eyes makes it possible to obtain universal adjustment of each of the barrels 21 and 22 about the center of rotation of the patient's eye that looks into that barrel.

There are plates 68 attached to each of the blocks 55 (Fig. 4) by a bracket 69. A block 70 (Fig. 5) slides lengthwise in a guide slot 71 in each of the plates 68. A pin 72 extending upwardly from each block 70 passes through a slot 73 in an arm 74 rigidly connected with the adjacent post 24.

A scale 76 extends along one edge of the guide slot 71 and has slotted ends through which screws 78 extend for clamping the scale 76 to the plate 68. The screws 78 preferably thread into the plate 68 and they can be loosened to permit adjustment of the scale 76 lengthwise of the guide slot 71 for obtaining a zero adjustment of the instrument for different desired angles of convergence.

Angular movement of the arm 74 with the post 24 causes the arm to move the block 70 lengthwise of the guide slot 71. An indicator on the block 70 moves toward the right or left from the zero indication on the scale 76, depending upon the direction of angular movement of the post 24 and arm 74. As in the case of the adjustment scale 38, the scale 76 is preferably laid off in equal divisions reading directly in prism diopters corresponding to the adjustment of the barrels and their supporting posts about the vertical axes of the pivots 54. There is a vernier scale on the block 70 for obtaining accurate readings of the motion of the arm 74.

Figure 2:
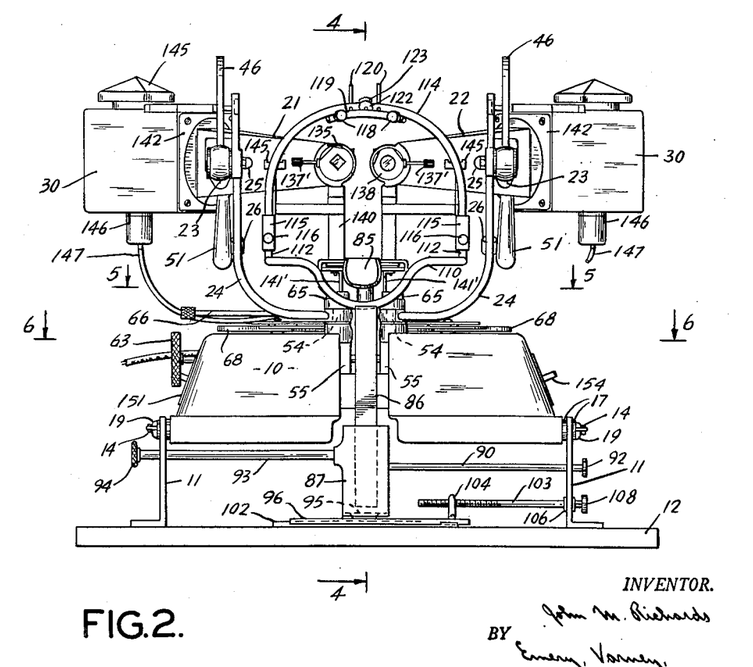
Figs. 2 and 3 are front and side views, respectively, of the instrument shown in Fig. 1.

It is important to have the patient's eyes accurately positioned with respect to the testing apparatus and it is also important that the centers of rotation of the patient's eyes remain in the same positions during the testing period. The instrument is provided with a head rest that includes a chin rest 85 (Fig. 4) secured to the upper end of a frame 86 which can be moved up and down in a bearing 87. A rack on the lower end of the frame 86 meshes with a pinion 89 on a shaft 90. This shaft 90 extends through one end of the housing 10 and has a knob 92 (Fig. 6) for turning the shaft and pinion to raise and lower the frame 86 and the chin rest 85. The frame 86 can be clamped in any adjusted position by a set screw 93 (Fig. 2). This set screw 93 extends to one side of the machine and is operated by a knob 94.

The bearing 87 is attached to a plate 95 which slides on a base plate 96 in a forward and aft direction. A screw 97 (Fig. 4) held against longitudinal movement by a thrust bearing 98, threads through a lug 99 extending upward from the plate 95. The screw 97 extends rearwardly to a knob 100 located at a convenient position for a manual operation to turn the screw 97 when the head rest is to be adjusted forwardly or rearwardly with respect to the rest of the apparatus.

There are guides 102 on the base 12, and these guides provide bearings on which the base plate 96 slides sideways for adjusting the head rest toward one side or the other. Sideways adjustment of the base plate 96 is effected by turning a screw 103 (Fig. 6) which threads through a lug 104 secured to the top of the base plate 96. This screw 103 is held against longitudinal displacement by a thrust bearing 106 attached to the bracket 11 so that rotation of the screw 103 will cause movement of the base plate 96 transversely on the base 12. A handle 108 at the end of the screw 103 is used to turn the screw when the head rest is to be adjusted sideways.

The head rest also includes a support 110 (Fig. 2) connected at its center with the frame 86 and extending beyond both sides of the chin rest 85. The support 110 has upstanding ends 112 spaced apart by a distance greater than the width of the patient's head. A bow 114 has its opposite ends connected with the upstanding ends 112 by connectors 115 provided with clamping screws 116 for adjustment of the height of the bow 114.

A forehead rest comprising buttons 118 on a cross bar 119 is connected with the bow 114 by pins 120, that extend from the bar 119 through holes in the bow, and a stud bolt 122 that threads through a nut 123 and provides for accurate adjustment of the spacing of the cross bar 119 from the bow 114 of the head rest. The nut 123 is assembled with the bow 114 in such a way that the bow serves as a thrust bearing to prevent longitudinal movement of the nut 123 in either direction.

When adjusting the head rest, the chin rest 85 is first raised to bring the patient's eyes to the same level as the axes of eye pieces 35 and 36 of the instrument. The forehead rest is then adjusted to move the patient's face forward or rearward far enough to line up the centers of rotation of the patient's eyes with the axis of the pivot connections 25. Sidewise movement of plate 96 by turning handle 108 provides symmetrical alinement of the eyes with respect to the midline of the instrument. Then the axes of the vertical pivots 54 are automatically alined with the centers of rotation of the patient's eyes when the instrument is adjusted for the interpupilary distance of the patient.

This interpupilary distance may be measured by the examiner holding a scale in front of the patient's eyes, and the instrument can be adjusted for this distance. A scale for determining the interpupilary distance adjustment of the instrument at any time is provided on a strip 126 (Fig. 5) that is attached to the right hand plate 68. This scale moves with respect to an indicator 127 on the left hand plate 68. The scale on strip 126 is graduated in terms of interpupilary distance, that is, the distance between the axes of the pivots 54.

More accurate adjustment of the instrument for the interpupilary distance of the patient can be made by opening doors 130 (Fig. 1) located at the rearward ends of the eye pieces 35 and 36. These doors may be slides but are preferably connected with the eye pieces by a hinge 132 (Fig. 7). A partially transmitting, partially reflecting, and preferably front surfaced mirror 133 is located in the eye piece 36 in position to deflect the patient's line of vision longitudinally down the barrel 22. Since the mirror 133 is partially transmitting, the examiner looking through the open door 130 can see the patient's eyes and can adjust the instrument to position the eye pieces in perfect alinement with the patient's pupils. Cross hairs or other axial alinement marks are placed in the eye pieces for accurate adjustment of the eye pieces. An advantage of the transparency of the mirrors is that for some tests the examiner can leave the doors 130 open and watch the response of the patient's eyes to the display of the target. With strong illumination of the targets, the patient sees only the targets even though the doors 130 are open. Ordinarily, however, the door 130 is closed while the mirror 133 is used for its reflecting function.

A lens cell 135 is attached to the eye piece 36 and can be used for holding lenses or masks or both. When used with the proper targets, the instrument of this invention has all of the adjustments necessary for determining separately the horizontal, vertical and torsional tonic muscle imbalance of the eyes without resorting to the use of eikonic lenses.

In order to relax the accommodation of the eye when adjusting the instrument for convergence at infinity, a lens 136 is located in the eyepiece 36. When the instrument is to be used for convergence at a closer distance, an additional lens is inserted in the lens cell 135, the power of the additional lens being chosen to make the eye accommodate for the particular distance of convergence to which the barrels are to be adjusted. The dioptric power of this additional lens is the negative reciprocal of the convergence distance minus the distance from the eye to the lens in meters.

In Figure 2 the lens cells 135 are shown with lenses thereon connected to handles 137 by which the lenses are conveniently removed or replaced in the lens cells, and the lenses are shown with masks 138 having incongruent openings for preventing the patient from fusing the borders of the eye piece apertures.

Figure 9:
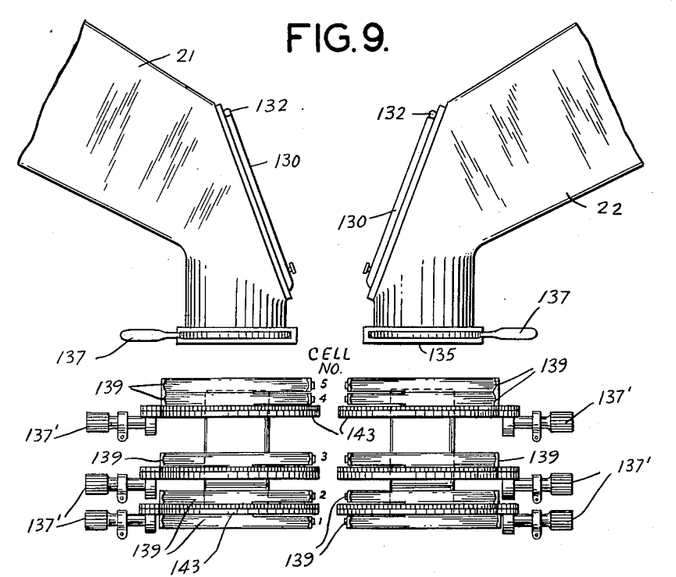
Fig. 9 is a detail view of the lens cells.

In front of each of the eye pieces 35 and 36 there is a series of five lens cells, and these cells are separated from the barrel movement, each cell being mounted on the arm 140 leading to a base 141 which is fixed to the plate 68 beneath it. These lens cells may be maintained static for any of the positions of convergence of the barrels. The relative positions and movements of the different lens cells 139 is best illustrated in Figure 9. The two lens cells nearest the patient's eyes are connected with a ring 143 which turns in a bearing 144. The lens cells 139 are connected with opposite sides of the ring 143 and turn as a unit with the ring. Gear teeth on the ring 143 mesh with teeth of a pinion gear at one end of a handle 137', which is used for rotating the lens cells to adjust the meridional axes of the lenses held in the lens cells 139.

Figure 10:
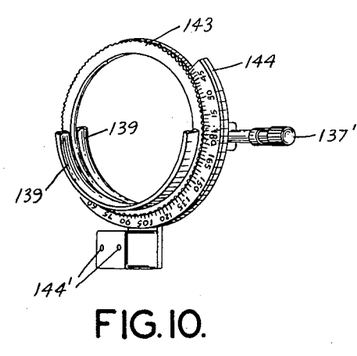
Fig. 10 is a perspective view of a portion of the structure shown in Fig. 9.

The third lens cell from the patient's eyes is connected with a ring 143 and rotated by a handle 137' in the same manner as the structure shown in Figure 10, but the second handle 137' rotates only one lens cell. The two lens cells 139 furthest from the patient's eyes are connected together and to another ring 143 rotated by the third handle 127'.

Each of the bearings 144 has a base for connecting it with the support 140 directly, or for connecting it with the base of the immediately adjacent lens cell. These connections are preferably made by studs or pins extending into openings, such as the openings 144' of Figure 10.

The two lens cells nearer the patient's eyes are utilized for any power correction or for any prism correction required and are removable if the patient is to wear his own glasses. The third lens cell preferably contains a prism that is available for use in testing (for final checking) even when the patient is tested with his glasses on. The other two cells are used for any eikonic lens correction required by the patient and may be used as verification of the instrument finally. Arbitrarily the cells are numbered from the patient's eye toward the instrument. Although other sequences may be used, the preferred one is: in cell 1 the spherical refractive correction is placed; in cell 2 the meridional refractive correction is placed; in cell 3 the prism correction is placed; in cell 4 a spherical eikonic correction is placed; and cell 5 is for a meridional eikonic lens. The meridional lens in cell 5 is rotatable discretely separately from the prism in cell 3 or from the refractive cylinder in cell 2, in order to obtain the proper axis in each case.

The arms 140 are connected with their bases 141 by clamping screws 140a. These screws can be loosened to permit movement of the arms to maintain the lens cells and lenses on the optical axes of the barrels when the barrels are adjusted for different angles of convergence. Sights 145 are connected with the arms 140 at opposite sides of the patient's face for lining up the apparatus and the centers of rotation of the patient's eyes.

Figure 5:
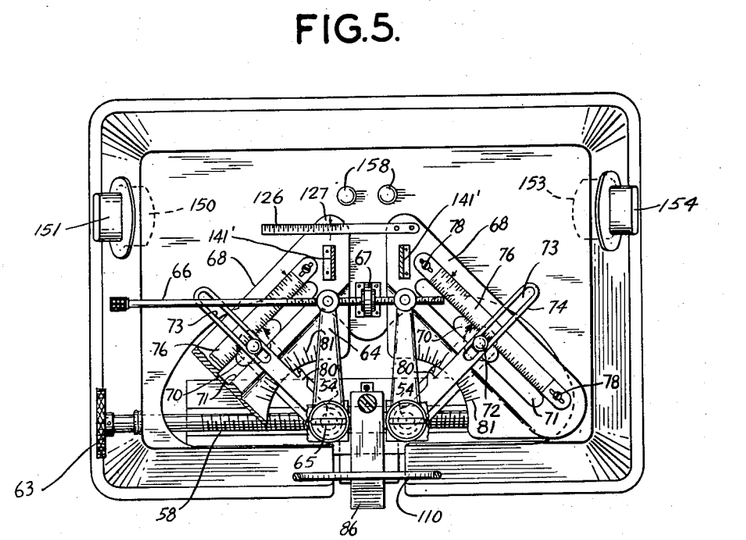
Figs. 5 and 6 are enlarged horizontal sectional views taken on the lines 5—5 and 6—6 respectively of Figure 2.

The bases 141 that support the respective arms 140 are connected by brackets 141' with plates 68 associated with the corresponding barrels with which each of arms 140 is used. Since plates 68 are always adjusted relatively according to the interpupillary distance of the patient when the eye pieces 35 and 36 have their axes alined, it follows that the lens cells supported by arms 140 through bases 141 to plates 68 are automatically adjusted likewise. The connections of the individual brackets 141' with the respective plates 68 is shown in Figure 5.

In order to simulate common spectacle positions of use "static lens cells" are needed either for the essentially infinite position of gaze with the primary visual axes parallel, or for the reading position with the optical axes down 20 degrees and converging at 40 cm. from the patient upon a plane perpendicularly bisecting the line connecting the centers of rotation of the two eyes. Static lens cells, separate from the movement of the instrument target barrels, provide a most important concept.

Consider that a patient may have in his spherical glass correction a plus lens in front of the right eye and a minus lens in front of the left. Then if these lenses be centered in front of his eyes, there is no prismatic deviation caused by them for any object viewed through their optical centers. If, however, this patient should turn his eyes to the right for a given angle toward an object an infinite distance away, this object by its projected images to the two eyes noted will cause his eyes to have to diverge to see the images along the visual axes (primary) directly, whereas looking to the left an equal angle from the binoculus his eyes must then converge equally oppositely. This creates a much different condition of the tonic muscle effect than keeping the optical centers of these lenses in line with the direction of gaze of each eye. Consider the even more varied picture with different cylinder strength and axes and their effect in different directions of gaze creating a different effect for each different gaze position.

Whereas eikonic lenses are designed for their eyes-front effect on the retinal image pattern provided by the secondary visual axes as well as the primary axes in relation to these secondary ones in any given static image pattern (and considered especially with the primary visual axes directed through the optical centers of the eikonic lenses) it is not "aniseikonia," as the term is now commonly used, which this invention is testing for with the static lens cells, but rather true dynamic "tonic" muscle imbalance which is a function of the angular deviation of the direction of gaze along the primary visual axes of the two eyes from each other—not the function of static secondary visual axes perception which forms the basis for the horopter concept on which all aniseikonia theory and practice have been based.

These measurements may show either symmetrical or asymmetrical muscle imbalance, or both, and can be used in the correction of such defects. If such defects be induced by the patient's spectacle correction, it is most important to measure the effect as evidenced in his eye reaction. Such an effect may occur without glasses, or the glasses may be the sole cause, or these two may be additive. The measurement of such defects within about 0.1 prism diopter accuracy is needed clinically and gross manipulations obscure necessary clinical results. Therefore, the verniers.

Referring again to Figure 7, the target holder 28 has a groove at its forward end fitting around the circular flange 27 that serves as the bearing on which the target holder 28 is adjustable angularly in a plane perpendicular to the axis of the barrel 22. A ring 142 attached to the target holder 28 overlaps the flange 27 and maintains the target holder and barrel 22 in assembled relation. There are two recesses 143 for targets or masks which are inserted in the target holder 28 through an opening in the top of the target holder. This opening is covered by a door 144 (Figs. 1 and 3), hinged to the top of the target holder and which can be closed to prevent entrance or emergence of light. A lamp is located in the housing 30, and a chimney 145 is constructed to permit the escape of hot air. A lamp in the housing 30 is held in a lamp socket 146 supplied with power through a cable 147.

The power cable 147 (Fig. 3) from the left hand housing 30 extends downward to the region of the left hand pivot 54 and then enters the housing 10 and leads to an adjustable rheostat 150 attached to the inside of the housing. This rheostat has a handle 151 for changing the resistance in series with the lamp to vary the intensity of the illumination of the target in the left hand target holder 28. The power cable 147 (Fig. 4) from the right hand lamp housing extends down similarly to a region adjacent the right hand pivot 54, and then into the housing 10 to another rheostat 153 having an adjustment knob 154 (Fig. 6) by which intensity of illumination of the target for the right eye may be varied.

The rheostat 150 is supplied with power from a switch 156, and the rheostat 153 is supplied with power from a similar switch 157. Both of these switches have a bias toward closed position and each has a push button 158 by which it can be opened. These switches 156 and 157 are located close together on the back of the housing so that the examiner can manipulate the buttons 158 to interrupt the illumination of the targets in either of the target holders, or to interrupt the illumination of the targets in both the target holders simultaneously.

For effecting accurate angular adjustment of the target holder 28 on the barrel 22, and for maintaining the target holder in its adjusted position, a screw 160 (Fig. 4) is provided. This screw threads through a nut 161 attached to the barrel 22 by a bracket 162. An adjusting knob 164 is secured to the upper end of screw 160. This knob 164 has an annular groove which fits into a slot in an extension of the ring 142. The annular groove and slot cooperate as thrust bearings to prevent longitudinal movement of the screw 160 so that any rotation of the knob 164 and screw 160 causes the nut 161 to be shifted up and down and effect angular movement of the target holder 28.

Although the nut 161 is connected with the bracket 162 in such a way that the nut can turn about a horizontal axis to maintain itself in line with the screw 160, it is possible to obtain only a limited angular adjustment of the target holder by means of the screw 160 because rotary movement of the target holder requires transverse movement of the screw, and the slot in which the annular groove of the knob 164 is held permits only a limited transverse movement.

For greater adjustment of the target holder with respect to the barrel 22, the screw 160 is removable from the slot in the frame 27, but for the torsional adjustment necessary when testing with targets, the construction shown provides ample latitude.

The preferred embodiment of the invention has been shown and described, but changes and modifications can be made, and some features of the invention can be used alone or in different combinations without departing from the invention as defined in the claims.

I claim as my invention:

1. Eye testing apparatus comprising a supporting structure, right and left hand posts carried by said structure and movable about substantially vertical axes in line with the centers of rotation of the right and left eyes, respectively, of a patient when the apparatus is in use, a bracket connected with each of said posts by a pivot connection on which the bracket is movable about a substantially horizontal axis, the horizontal axes of the pivot connections being in line with the centers of rotation of the right and left eyes of the patient, a target display device carried by each of said brackets, an eyepiece on each of the target display devices, a lens holder connected to each of the eyepieces and movable with its connected eyepiece for maintaining a lens with its optical axes substantially fixed in the line of vision of the display device with which it is connected, a lens cell secured to each of the eyepieces for movement therewith and for holding an additional lens in line with the eyepiece, other lens holders having framework in which test lenses are removably held in front of the respective eyepieces and the associated lens cells carried thereby, bracket means connecting said other lens holders directly with the supporting structure independently of the posts so that the other lens holders remain stationary while the target display devices and their lens cells swing with respect to the supporting structure about their vertical and horizontal axes of movement, and adjusting means on the apparatus that changes the interpupilary distance of the target-display devices and of all of said lens cells and lens holders.

2. Apparatus for testing the eyes for tonic muscle imbalance in different positions of gaze by the display of separate targets simultaneously to the right and left eyes of a patient, said apparatus including in combination a target display device for each eye, supports on which the target display devices are movable about axes in line with the centers of rotation of the respective eyes of the patient, measuring elements including a scale and an indicator one of which is connected with the target display device by motion transmitting connections and the other of which is connected with the support, said scale having uniform and equally spaced graduations in prism diopters, and a motion-transmitting linkage connection having relatively movable elements, one of said relatively movable elements having one of the measuring elements thereon and said relatively movable elements being constructed and arranged so that equal angular movements of the target display device progressively along an arc produces unequal movements of one of said measuring elements with respect to the other in accordance with the tangent of the angular movement whereby the indicator in connection with the scale denotes the muscle imbalance directly in prism diopters.

3. Eye-testing apparatus including a target display device, a bearing on which said display device is movable angularly about an axis adjacent to an eye of a patient being tested, measuring elements including an indicator and a scale one of which is connected with target display device by motion-transmitting connections and the other of which is connected with the support, the indicator being movable along the scale, uniform graduations on the scale in prism diopter equivalents of the angular movement of the display device, a vernier scale on the indicator, and a motion-transmitting connection having relatively movable elements, one of said relatively movable elements having one of the measuring elements thereon and the other relatively movable element being constructed and arranged so that equal angular movements of the target display device progressively along an arc about said axis adjacent to the eye produces unequal movements of one of said measuring elements with respect to the other in accordance with the tangent of the angular movement whereby the indicator in connection with the scale denotes the muscle imbalance directly in prism diopters.

4. Eye-testing apparatus including a target display device, a bearing on which said display device is movable with respect to a support and angularly about an axis, a plate connected with said support and having a constraining guideway therein, a scale along one edge of the guideway, said scale being graduated uniformly in prism diopter equivalents of the angular movement of the display device, a runner that moves along the guideway and that is constrained by the guideway to straight line motion, said runner having an indicator and a vernier scale thereon for cooperation with the scale along the edge of the guideway, a pin secured to the runner and extending from the runner in a direction substantially perpendicular to the guideway and the scale, an arm extending lengthwise at an angle to the length of the guide slot and connected with the target display device and movable as a unit with the display device about the axis of the display device, said arm having a slot that extends in the direction of the length of the arm and through which the pin extends for imparting movement to the runner in response to angular movement of the arm.

5. Eye testing equipment including a base, a head rest supported from the base for maintaining a patient's eyes in a definite relation to other elements of the equipment, a frame supported from the base, two target-display devices, separate bearings supported by the frame and on which each of the target-display devices has angular movement about a vertically extending axis substantially in line with the center of rotation of the eye for which that target-display device is used when the patient has his head in position on the head rest, and other bearings on which the frame is supported from the base and on which the entire frame is movable with respect to the base and the head rest about a horizontal axis through the centers of rotation of the eyes of the patient and independently of the positions of the diplay devices with respect to the frame.

6. Eye testing equipment as described in claim 5 and in which the target-display devices are supported by bearings on which the display devices have angular movement about a horizontal axis that is substantially coincident with the line through the centers of rotation of the eyes of a patient using the head rest, in addition to the angular movement of the display devices about the vertical axes through the centers of rotation of the eyes of the patient.

7. Eye testing apparatus comprising a base, a head rest supported from the base for maintaining a patient's eyes in a definite relation to other elements of the apparatus, a housing supported from the base, a device for displaying a target to the left eye of a patient, a bearing supporting said device from the housing and on which the display device swings angularly about an axis that is at a predetermined angle to the housing and substantially in alignment with a line through the centers of rotation of the eyes of the patient using the head rest, a second device for displaying a target to the right eye of a patient, a bearing supporting said second device from the housing and on which the second display device swings angularly independently of the first display device and about an axis that is at a predetermined angle to the housing and substantially in alignment with the line joining the centers of rotation of the eyes of the patient, and supporting means on which the housing is supported from the base and on which the housing is adjustable with respect to the head rest and about an axis substantially coincident with the line connecting the centers of rotation of the eyes of a patient using the head rest to tilt the entire housing in a direction to shift both of the target display devices simultaneously to change the level of the positions of gaze.

8. Eye-testing apparatus as described in claim 7 and in which each of the target display devices is also connected with the housing by a pivot connection that has its axis in substantially vertical alignment with the center of rotation of the eye that uses that display device, and in which the supporting means for the housing comprises bearings on which the housing is movable downward to display the targets along lines of vision sloping downward away from the patient for simulating reading positions of gaze.

9. Apparatus for testing the eyes by their response to target displays, said apparatus comprising target display devices for the left and right eyes, respectively, a common support by which both of the display devices are carried, a connection between the support and each of the target display devices including a pivot on which the display device is angularly movable with respect to the support and independently of the other display device, a base, a connection between the support and base including arcuate slot bearings and projections extending into the slots, some of which are on the base and some of which are on the support, said projections extending into the bearings and being movable in the bearings about an axis that is substantially coincident with a horizontal line through the centers of rotation of the patient's eyes when the apparatus is in use, to shift both of the target display devices simultaneously, a head rest for maintaining a patient's eyes in a definite relation to the target display devices, and adjustable connections that support the head rest from the base and that are independent of the support for the display devices.

10. In an eye testing apparatus, a target display device, a base, a support connected with the base on which the target display device is movable angularly about an axis extending upwardly from the base adjacent to an eye of a patient being tested, a scale and an indicator, one of which is connected with the base and the other of which is connected with the target display device and movable along the base, and motion transmitting connections through which the target display device causes relative movement of the scale and indicator, said motion-transmitting connections including an arm that moves angularly with said target display device about said axis adjacent to the eye, and including also a sliding connection that causes relative movement of the scale and indicator, the direction of movement of the elements of the motion-transmitting connections being coordinated and of such a nature that the relative movement of the scale and indicator corresponds to the tangent of the angular movement of the arm and the scale denotes the muscle imbalance directly in prism diopters.

11. An eye-testing instrument comprising a supporting structure, two movable target display devices, an eye piece associated with each device and through which a patient views the targets in the display device, one of the eye pieces being in position for the patient's right eye and the other eye piece being in position for his left eye, lens supports connected with and extending from the said supporting structure to positions in front of the respective eye pieces, said lens supports having frameworks in which testing lenses are removably held between the eye pieces and the patient's eyes in fixed positions during movement of the target-display devices into different positions, and supporting means for the target-display devices rearward of said lens supports and extending forwardly to locations forward of the lens supports, said supporting means being connected to the supporting structure at the forward locations by bearings on which the target-display devices swing about substantially vertical axes that are forward of the lens supports and in line with the centers of rotation of the eyes of the patient using the instrument and while said lens supports remain in fixed positions with respect to said supporting structure.

12. The eye testing instrument described in claim 11 and in which the supporting structure includes two portions that are movable toward and from one another, and in which one portion is connected to the lens support and the supporting means for the target display device for the left eye, and the other portion of the supporting structure is connected with the lens support and the supporting means for the target display device of the right eye, and means for moving both portions of the supporting structure toward and from one another to shift each target display device and its associated lens support simultaneously with respect to the other target display device and its associated lens support to adjust the instrument with different interpupilary distances.

13. An eye testing instrument as described in claim 11 and in which said lens supports are connected with the supporting structure by fastening means that are releasable to make said lens supports movable with respect to the supporting structure independently of the target-display devices for changing the positions of said lens supports independently of the positions of the target-display devices.

14. Eye-testing equipment including a base, a head rest supported from the base for maintaining a patient's eyes in a definite relation to other elements of the equipment, a frame supported from the base, two target-display devices, separate bearings supported by the frame and on which the respective display devices have angular movement about a horizontal axis that is substantially co-incident with a line through the centers of rotation of the eyes of a patient using the head rest, and other bearings on which the frame is supported from the base and on which the entire frame is movable with respect to the base and the head rest about substantially the same horizontal axis as the display devices and independently of the positions of the display devices with respect to the frame.

15. An eye testing instrument comprising a supporting structure, two movable target-display devices, an eye piece associated with each device and through which a patient views the targets in the display device, one of the eye pieces being in position for the patient's right eye and the other eye piece being in position for his left eye, lens supports connected with and extending from the said supporting structure to positions in front of the respective eye pieces, said lens supports having frameworks in which testing lenses are removably held between the eye pieces and the patient's eyes in fixed positions during movement of the target-display devices into different positions, supporting means for the target-display devices rearward of said lens supports and extending forwardly to locations forward of the lens supports, said supporting means being connected to the supporting structure at the forward locations by bearings on which the target-display devices swing about substantially vertical axes that are forward of the lens supports and in line with the centers of rotation of the eyes of the patient using the instrument and while said lens supports remain in fixed positions with respect to said supporting structure, the lens supports being connected with the supporting structure by releasable connections which are adjustable to accommodate the lens supports, and the lenses carried thereby, to different angles of convergence for which the target-display devices may be set, at least one lens holder in each framework, at the end next to the patient's eyes, which are removable for patients who are tested while wearing their own glasses, and means for rotating lenses in one or more of the lens holders.

JOHN MARK RICHARDS.

References Cited in the file of this patent

UNITED STATES PATENTS

| Number | Name | Date |
|---|---|---|
| 1,918,177 | Boquist et al. | July 11, 1933 |
| 2,063,015 | Ames, Jr. | Dec. 8, 1936 |
| 2,104,552 | Blee et al. | Jan. 4, 1938 |
| 2,152,050 | Henning et al. | Mar. 28, 1939 |
| 2,262,217 | Wottring | Nov. 11, 1941 |
| 2,316,139 | Wottring | Apr. 6, 1943 |

FOREIGN PATENTS

| Number | Country | Date |
|---|---|---|
| 354,999 | Great Britain | Aug. 20, 1931 |
| 355,626 | Great Britain | Aug. 27, 1931 |